US010102182B2

(12) United States Patent
Lum (10) Patent No.: US 10,102,182 B2
(45) Date of Patent: *Oct. 16, 2018

(54) INDICATORS OF TEXT CONTINUITY (71) Applicant: Nicholas Lum, Woodside, CA (US)

(72) Inventor: Nicholas Lum, Woodside, CA (US)

(73) Assignee: Beeline Reader, Inc., Woodside, CA (US)

( * ) Notice: Subject to any disclaimer, the term of this patent is extended or adjusted under 35 U.S.C. 154(b) by 484 days.

This patent is subject to a terminal disclaimer.

(21) Appl. No.: 14/703,729

(22) Filed: May 4, 2015

(65) Prior Publication Data
US 2015/0234788 A1 Aug. 20, 2015

Related U.S. Application Data (63) Continuation of application No. 13/015,415, filed on Jan. 27, 2011, now Pat. No. 9,026,907, which is a
(Continued)

(51) Int. Cl.
G06F 17/00 (2006.01)
G06F 17/21 (2006.01)
G06F 17/24 (2006.01)
(52) U.S. Cl.
CPC ............ *G06F 17/211* (2013.01); *G06F 17/24* (2013.01)
(58) Field of Classification Search
CPC ................................................ G06F 17/30905
(Continued)

(56) References Cited

U.S. PATENT DOCUMENTS 6,130,968 A 10/2000 McIan et al.
6,279,017 B1 8/2001 Walker
(Continued)

FOREIGN PATENT DOCUMENTS

CN 1577328 A 2/2005
JP 2004-295856 10/2004
(Continued)

OTHER PUBLICATIONS

Office Action recieved in Canadian Patent Application No. 2,794,908, filed Aug. 9, 2012. Received from the Canadian Intellectual Property Office dated Nov. 30, 2016. 6 pages.
(Continued)

*Primary Examiner* — Manglesh M Patel
(74) *Attorney, Agent, or Firm* — Fish & Richardson P.C.

(57) ABSTRACT

Methods, systems, and apparatus, including computer programs encoded on computer storage media for graphically indicating text continuity. One method includes receiving text including a first line of text followed by a second line of text followed by a third line of text and selecting a distinct line beginning and line end of each of the first, second, and third lines of text. The method further includes formatting the text, including setting respective first attribute values for a first appearance attribute, so that, with respect to the first appearance attribute, the text has a continuity of visual appearance from the first line end to the second line beginning, and so that, with respect to the first appearance attribute, no continuity of visual appearance exists from the first line end to either the first line beginning or to the third line beginning, and presenting the formatted text on the output device.

20 Claims, 4 Drawing Sheets

Related U.S. Application Data continuation-in-part of application No. 12/887,935, filed on Sep. 22, 2010, now abandoned.

(60) Provisional application No. 61/337,782, filed on Feb. 12, 2010.

(58) Field of Classification Search
USPC .................. 715/256, 275, 255, 249, 200
See application file for complete search history.

(56) References Cited

U.S. PATENT DOCUMENTS

| | | |
|---|---|---|
| 6,438,515 B1 | 8/2002 | Crawford et al. |
| 6,766,495 B1 | 7/2004 | Bates et al. |
| 7,188,306 B1 | 3/2007 | Chang et al. |
| 2002/0124026 A1 | 9/2002 | Weber |
| 2003/0215775 A1 | 11/2003 | Bizziocchi |
| 2004/0253568 A1 | 12/2004 | Shaver-Trump |
| 2010/0146444 A1 | 6/2010 | Wang et al. |
| 2011/0202832 A1 | 8/2011 | Lum |
| 2011/0231755 A1 | 9/2011 | Herzner |

FOREIGN PATENT DOCUMENTS

| | | |
|---|---|---|
| KR | 1020070040206 | 4/2007 |
| KR | 1020080050718 | 6/2008 |

OTHER PUBLICATIONS

"Screenshots from Rainbow Text Color Fader—Gradient text for email, forums, etc.", Retrieved from the Internet: URL:http://patorjk/text-color-fader/ [retrieved on Jan. 23, 2011], 4 pp.

Notification of Transmittal of the International Search Report and the Written Opinion of the International Searching Authority, or the Declaration, PCT/US2011/022756, dated Sep. 9, 2011, 5 pages.

Translation of Chinese Office Action received from Chinese Application No. 201180018739.X, dated Aug. 19, 2014. 12 pp.

Notification of Second Office Action for Chinese Application No. 201180018739.X, issued by SIPO dated May 20, 2015, 10 pp.

Summary and partial translation in English of Second Office Action issued by SIPO dated May 20, 2015, 6 pp.

INDICATORS OF TEXT CONTINUITY

CROSS-REFERENCE TO RELATED APPLICATIONS

This application is a continuation application of, and claims priority to, U.S. patent application Ser. No. 13/015,415, which is a continuation-in-part application of, and claims priority to, U.S. patent application Ser. No. 12/887,935, both entitled "Indicators of Text Continuity," both to Nicholas Lum. This application also claims the benefit under 35 U.S.C. § 119(e) of U.S. patent application Ser. No. 61/337,782, titled "Reading-Assistive Text Modification System," filed Feb. 12, 2010. The disclosures of the foregoing applications are incorporated here by reference in its entirety.

BACKGROUND

This specification relates to displaying content on content presentation devices.

User devices, for example, desktop and laptop computers, cellular phones, and electronic book readers use displays to present content, for example, text, to users. Devices with large displays, such as desktop computers, often display many lines of text that span long horizontal distances. When reading this text, a user must track, e.g., with his or her eyes, a long distance from the end of one line of text to the beginning of the next line of text. As a result, a user may make mistakes as he or she transitions between lines. That is, after reaching the end of line N, the user may erroneously continue reading on a line other than line N+1 (e.g., N or N+2) because of the difficulty in accurately identifying the proper line (line N+1). Such transitional mistakes cost the user time and distract his or her focus. For example, some users will focus on identifying the correct line of text to the detriment of the user's focus on the content of the text. As another example, some users will repeatedly re-read portions of the text rather than transitioning to the next line.

While smaller devices, such as small-screen laptops, tablets, netbooks, electronic book readers, and cellular phones, generally have smaller displays than desktop computers, users can still make transitional mistakes when reading text on these smaller devices. Although the horizontal tracking distance is often shorter on smaller devices than on larger devices, the text size is typically smaller and the lines of text are often more vertically compressed. This can increase the risk of transitional mistakes. Environmental factors can also make reading on smaller, portable, devices difficult. Users commonly read on these devices while moving, e.g., while walking or riding in a train or car. Under these circumstances, the device and the user are both being jostled. This movement can further decrease a user's ability to accurately and quickly transition from one line to the next.

Although devices may allow users to adjust the width of the text window or adjust the size of the text, such adjustments decrease the amount of text that can be displayed on the screen and force the user to more frequently scroll or electronically flip through pages. This increases the time it takes for a user to read the content, and can also adversely affect the battery and processor of the device.

There are several existing text formatting techniques that assist readers in performing certain tasks; however, these techniques do not help the reader quickly and accurately transition between lines of text. One existing text formatting technique formats lines of text in a way that helps users distinguish between lines. For example, some web pages alternate the background color of lines of text. This type of formatting, however, mainly serves to help users track long distances across the same line. For example, such formatting may be used in tables as a way of visually distinguishing one row of data from the next, assisting the user in correlating an entry in the far left column of the row with a related entry in the far right column of the same row. This formatting accordingly does not assist users in quickly, accurately, and naturally transitioning from one line of text to the next. Indeed, this type of formatting can actually impede a user's ability to transition between lines of text because there is an abrupt disconnect between the appearance of the end of one line of text and the appearance of the beginning of the next line of text.

A second text formatting technique uses formatting to call the reader's attention to a particular section of text. For example, an important word or phrase might be formatted in bold, italics, or underline. This kind of formatting, however, does not assist users in quickly and accurately transitioning between lines of text. Instead, it simply calls the user's attention to the uniquely-formatted section of text.

A third text formatting technique formats words based on their position or function, for example, in a sentence or in a computer programming command. For example, Apple's Script Editor program, available from Apple Inc. of Cupertino, Calif., uses different colors to indicate the syntactic position, or part of speech, of words displayed on a screen. Although this formatting function may help users understand the structure of a sentence or computer program, it does not assist the user in transitioning between lines.

SUMMARY

In general, one innovative aspect of the subject matter described in this specification can be embodied in methods that include the actions of receiving text to be displayed on an output device as successive of lines of text, wherein the successive lines of text include a first line of text immediately followed by a second line of text immediately followed by a third line of text; selecting a distinct first line beginning and first line end of the first line of text, a distinct second line beginning and second line end of the second line of text, and a distinct third line beginning and third line end of the third line of text, wherein each beginning and each end is a portion of the respective line of text; formatting the text, including setting respective first attribute values for a first appearance attribute, so that, with respect to the first appearance attribute, the text has a continuity of visual appearance from the first line end to the second line beginning, and so that, with respect to the first appearance attribute, no continuity of visual appearance exists from the first line end to either the first line beginning or to the third line beginning; and presenting the formatted text on the output device. Other embodiments of this aspect include corresponding computer systems, apparatus, and computer programs recorded on one or more computer storage devices, each configured to perform the operations of the methods. A system of one or more computers can be configured to perform particular operations by virtue of there being software, firmware, hardware, or a combination of them installed on the system that in operation cause the system to perform the operations. A computer program can be configured to perform particular operations by virtue its including instructions that, when executed by data processing apparatus, cause the apparatus to perform the operations.

These and other embodiments can each optionally include one or more of the following features. Receiving the text comprises receiving the text represented as pixels in an image, and formatting the text comprises setting first attribute values for a first appearance attribute of at least some of the pixels in the image. The first appearance attribute is one of color or background. Receiving the text comprises receiving the text represented as pixels in an image, wherein the first attribute is size of the text, and wherein formatting the text comprises scaling regions of the image to modify the size of portions of the text. Receiving the text comprises receiving the text represented as characters having modifiable attributes, and formatting the text comprises setting respective first attribute values for a first appearance attribute of characters of the text. The first appearance attribute is one of color, size, weight, shape, background, or serif prominence.

When the first line of text, the second line of text, and the third line of text are received, characters in the text have respective initial attribute values for each of a plurality of appearance attributes including the first appearance attribute, and formatting the text further comprises not modifying attribute values for any appearance attributes in the plurality of appearance attributes other than the first appearance attribute. Formatting the text further comprises setting respective second attribute values for a second appearance attribute, so that, with respect to the second appearance attribute, the text has a continuity of visual appearance from the first line end to the second line beginning, and the text does not have a continuity of visual appearance from the first line end to either the first line beginning or the third line beginning.

The first appearance attribute and each respective first attribute value for the first appearance attribute is determined from one or more settings. The one or more settings are specified by one or more of a user, the output device, or a content provider. The one or more settings have an associated order, and attribute values specified by each setting are considered in the associated order. Each of the one or more settings is an affirmative setting specifying that a particular attribute value for the first appearance attribute should be used, or a prohibitory setting specifying that a particular attribute value for the first appearance attribute should not be used.

The first, second, and third lines of text each have a line middle that extends between the line beginning and the line end; and formatting the text further comprises setting respective first attribute values for the first appearance attribute for the line middle of each of the first, second, and third lines of text so that each line middle has first attribute values that transition from the first attribute value for the respective line beginning to the first attribute value for the respective line end. The first attribute values in each line middle are chosen according to a non-uniform transition rate. The first, second, and third lines of text have varying lengths, and the operations further comprise: determining a respective transition rate for each of the first, second, and third lines of text from the length of the line of text; and determining the first attribute value for each character in the line middle of each of the first, second, and third lines of text from the respective transition rate for the line. The first line of text has a first line middle that is between the first line beginning and the first line end, the first line middle has a fixed first attribute value for the first appearance attribute, and the first line middle is visually different from the first line beginning and the first line end, with respect to the first appearance attribute.

The actions further comprise detecting a change in an aspect of the physical environment of the output device; and reformatting the first, second, and third lines of text in response to detecting the change. Detecting a change in the aspect of the physical environment of the output device comprises detecting a change in vibrational motion of the output device, and reformatting the first, second, and third lines of text in response to detecting the change comprises modifying a size of each of the first, second, and third lines of text. Detecting a change in the aspect of the physical environment of the output device comprises detecting that an amount of illumination of the output device has changed.

The text has a continuity of visual appearance with respect to the first appearance attribute from the second line end to the third line beginning, and the text does not have a continuity of visual appearance with respect to the first appearance attribute from the second line beginning to either the second line end or the third line beginning.

The actions further include obtaining environmental information about the operating environment of the device from one or more sensors; and selecting the first appearance attribute and the respective first attribute values for the line beginnings and line ends of the first, second, and third lines of text according to the environmental information.

When the first line of text, the second line of text, and the third line of text are received, with respect to the first appearance attribute, the text has a continuity of visual appearance from the first line beginning to the first line end and the text has a continuity of visual appearance from the first line beginning to the second line end. The text that is received is unformatted and is not divided into lines; and selecting a distinct line beginning and line end of each of the first, second, and third lines of text comprises delimiting the first line, the second line and the third line. When the text is received the first line, the second line and the third line have been delimited. Formatting text so that, with respect to the first appearance attribute, the text has a continuity of visual appearance from a line end to a line beginning comprises setting the first appearance attribute to respective values that are selected to be within a predetermined threshold distance of each other. Formatting text so, with respect to the first appearance attribute, the text has a continuity of visual appearance from a line end to a line beginning comprises setting the first appearance attribute for the line end and the line beginning to respective preselected values that were previously selected to achieve visual similarity when applied to text output by the output device.

Particular embodiments of the subject matter described in this specification can be implemented so as to realize one or more of the following advantages. Users can read more quickly. Users can quickly, accurately, and naturally transition between lines while reading text on a display screen. Users can stay focused on the content they are reading, as opposed to focusing on where the next line begins. Users can easily find their place on a page after briefly looking away, for example, when giving a talk, speech, or presentation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
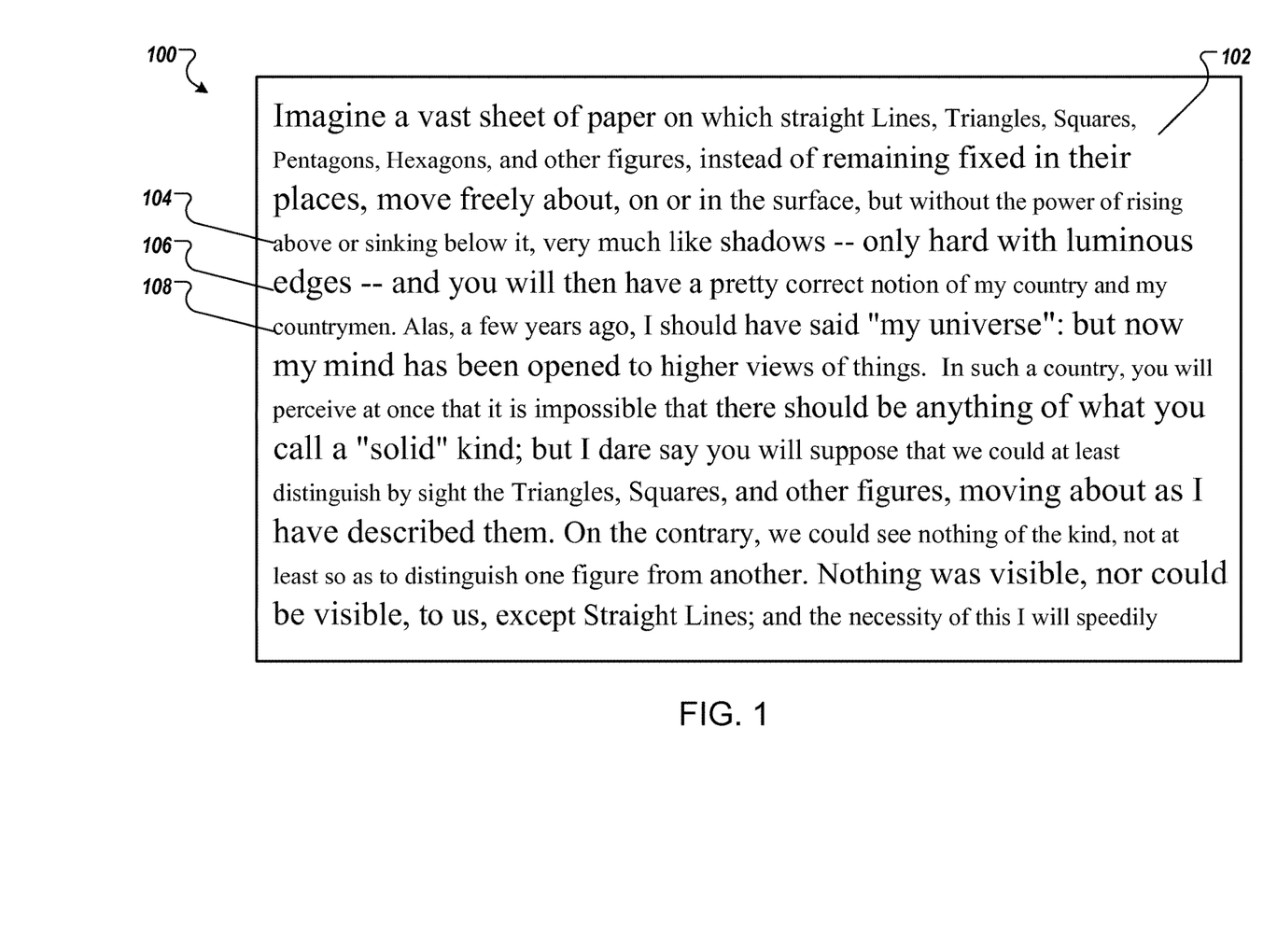
FIG. 1 is an example display showing text formatted to help users transition between lines while reading the text on the display.

FIG. 1 is an example display 100 showing text 102 formatted to help users transition between lines while reading the text on the display. In general, text is made up of characters in a written language, for example, English, Spanish, or Mandarin. Text does not include musical notation. The text 102 consists of multiple horizontal lines, although in some writing systems, the lines are vertical. The text 102 is formatted so that text at the end of each line is formatted the same as the text at the beginning of the following line, but different from the surrounding lines. This same and different formatting is with respect to one or more particular appearance attributes. In the example shown in FIG. 1, the particular appearance attribute is font size. For example, line 104 begins with a small font size, and increases until it ends in a bigger font size. Line 106 begins in the bigger font size, which matches the end of line 104 and differs from the beginning of line 104. Line 108 begins in the small font size, which matches the end of line 106 and differs from the beginning of line 106.

By formatting the end of one line like the beginning of the following line with respect to one or more particular appearance attributes, a device can make it easier for a user's eye to move from the end of one line to the beginning of the next. Thus, formatting text in this way can reduce user transitional mistakes.

Figure 2:
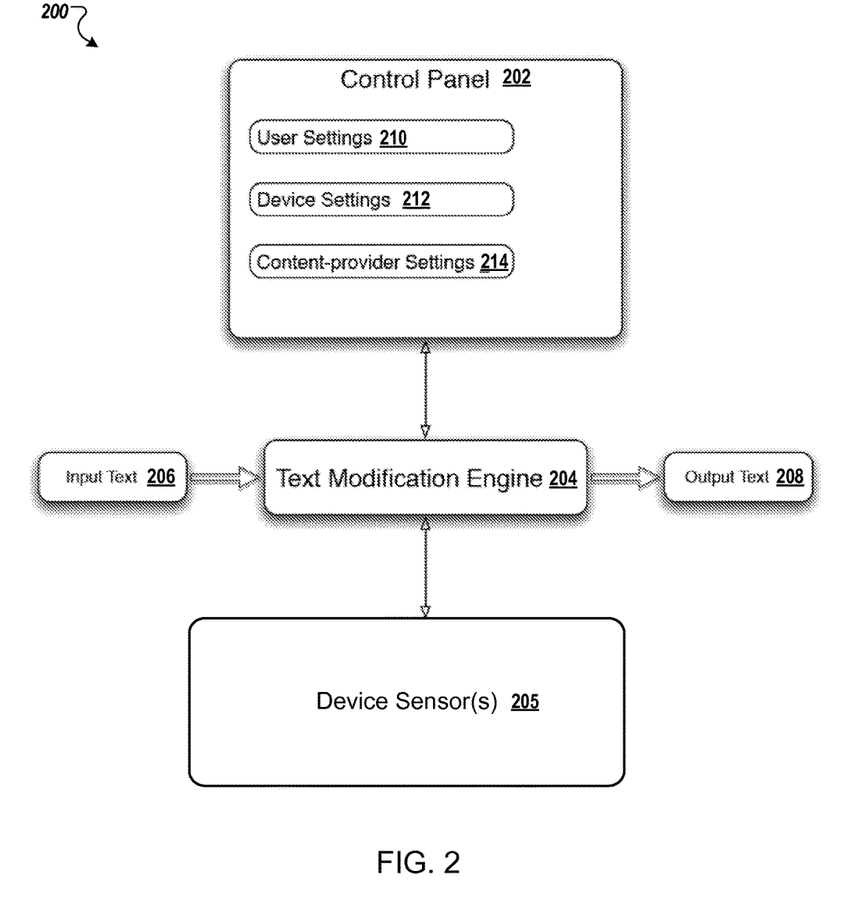
FIG. 2 is a block diagram of an example device for performing text modification.

FIG. 2 is a block diagram of an example device 200 for performing text modification. The device includes a control panel 202, a text modification engine 204, and optionally, one or more device sensors 205. The device 200 can also include other conventional components of conventional devices, for example, one or more processors, memory, one or more input devices, and one or more output devices.

The text modification engine 204 receives input text 206 and converts it to output text 208 according to settings maintained by the control panel 202 and optionally according to inputs to the device, e.g., received from the one or more device sensors 205.

The control panel 202 maintains various settings that determine the appearance of the output text 208. These settings can be, for example, user settings 210 specified by the user of the device, device settings 212 specified by the device itself, or content-provider settings 214 specified by the provider of the content displayed on the device. The control panel can also maintain settings specified by another source. The control panel can receive user settings 210 from a user through a user interface, and can receive content-provider settings 214, for example, by analyzing metadata for text provided by a content-provider. The device settings 212 are specified by the device manufacturer or reseller. The device settings can be stored, for example, in hardware, firmware, or software, and accessed by the control panel as needed.

The user can view and modify the settings in the control panel either through a unified interface for device-wide system settings or through a standalone interface that displays only settings for the control panel. For example, on a computer running the Mac OS X operating system available from Apple Inc. of Cupertino, Calif., the interface could either be integrated into the System Preferences application as a preference pane, or the interface could exist in its own application with a standalone preference interface. In some implementations, the user can view and modify all settings. In other implementations, the user can only modify some of the settings. For example, in some implementations, the user can view and modify the user settings 210 and can view, but not modify, the device settings 212 and the content provider settings 214.

The settings determine what appearance attributes the text modification engine 106 will change in the text, and what modifications the text modification engine will make to attribute values of the appearance attributes of the input text 106. Settings can be either affirmative, e.g., the font size must be 12, or prohibitory, e.g., the text may not be displayed in color. For example, some example appearance attributes that can be specified by the settings are color, size, shape, or serif prominence of the text itself, as well as the formatting of the area behind the text, e.g., background color.

The appearance attribute can include static text attributes, variable text attributes, or both. Static text attributes are generally applied uniformly to all characters in the text, or most of the characters of text. For example, the user may specify in the control panel that all text must be displayed in size 12 pt Times New Roman font. In order to accommodate headings, and other text that is formatted differently than most of the input text, the settings for static text attributes may allow a user to specify a base attribute setting, e.g., size or boldness, that applies to most, but not all, of the input text. Text that is formatted differently (e.g., a heading that is bold and of a larger typeface) would be allowed to retain its different formatting in the output text, but subject to certain limits. For example, the settings might allow specification of the maximum or minimum font size allowable. Static text attributes are included in the control panel so that the user may easily view and specify all text-related settings in the same place.

Variable text attributes, by contrast, are not uniformly applied to the text. Rather, variable text attributes are used to modify the text so that it is easier for the user to transition from the end of one line of text to the beginning of another. For example, in some implementations, the end of each line of text will be formatted the same way as the beginning of the next line of text with respect to a specified attribute.

In some implementations, the variable text attributes are attributes that do not change the semantic significance of the text, for example, text color, size, or prominence of serif. A variable text attribute does not change the semantic significance of text when it does not change how a reader perceives the relative importance of portions of the text with different values for the attribute.

For illustrative purposes, the description below describes modifying text according to a period. A period has a specified length, usually in number of lines, and has a beginning, a middle, and an end. The beginning and end of each period have the same appearance attribute value, while the middle of the period has a different appearance attribute value. Any text between the middle and the end can either have a constant appearance attribute value or can have appearance attribute values that transition from one value to another.

For example, if the period is of length two lines, then the first line of the period would start with appearance attribute value A and end with appearance attribute value B and the second line of the period would start with appearance attribute value B and end with appearance attribute value A. In some implementations, the length of the period is one of the settings specified in the control panel. In other implementations, the period always has a fixed length, for example, two lines.

Different variable text attributes can be used by the device 200. For example, if the variable text attribute is color, the device can alter the color of the text. Settings maintained by the control panel 202 can specify anchor colors used in the formatting. In some implementations, two anchor colors are used: one for the beginning and the end of text in the period, and one for text in the middle of the period. For example, if the anchor colors are red and blue, then the characters could be red at the beginning of the period, blue in the middle of the period, and red again at the end of the period. In some implementations, the characters between the text at the beginning and middle, and middle and end of the period have an intermediate color, e.g., purple or pink in the current example. In some implementations, the colors are a gradient ranging from one anchor color to the other.

As another example, if the variable text attribute is font size, the size of the characters of text would be altered. Settings maintained by the control panel 202 would allow for specification of the anchor sizes between which the characters would fluctuate. The anchor sizes are generally two sizes, one that is used for the beginning and end of text in the period, and one that is used for text in the middle of the period. For example, if the anchor sizes were 12 pt and 14 pt, the characters could be 12 pt at the beginning of the period, 14 pt at the middle of the period, and 12 pt again at the end of the period. In some implementations, the text between the text at the beginning and the middle of the period, and the middle and the end of the period, has an intermediate size, e.g., 13 pt. Fractional text sizes, e.g., 13.5 pt, can also be used.

As another example, if the variable text attribute is prominence of serif, the prominence of the serif of the text would be altered. For example, the control panel 202 could maintain settings indicating that the serif should range from no serif to prominent serif to no serif over the period, i.e., anchor serifs of none and prominent. At the beginning of the period, the characters would have no serif, in the middle of the period the characters would have full serifs, and at the end of the period the characters would again have no serif. In some implementations, text between the text at the beginning and middle of the period, and the middle and the end of the period, has intermediate levels of serifs. In some other implementations, the text between the text at the beginning and middle of the period and the text between the middle and the end of the period is formatted to have characters that alternate between serif and no serif, including more serif characters near the middle of the period and more no serif characters at the beginning and end of the period.

Although the above examples make use of two anchor points (e.g., red and blue colors, 12 and 14 pt font, or serifs and sans serifs fonts, it is not necessary that only two anchor points be used. For example, if text color were the variable text attribute, the text color could flow from red to purple to blue to green to yellow; it need not vary between just two anchor colors. Having many anchor points may be advantageous because it allows for many of the anchor colors to be black. For example, if four anchor colors were red, black, blue, and black, then roughly half of the output text would be a blackish color. Because users are likely most accustomed to reading black text, maximizing the amount of output text that is black can make the output text more pleasing to users.

In some implementations, the control panel 202 allows for the specification of multiple variable text attributes for a single body of text. For example, instead of just specifying one variable text attribute, e.g., the color of the text, the control panel can store multiple attributes as variable text attributes, e.g., the color of the text and the size of the text.

In some implementations, affirmative settings are comprehensive, e.g., they specify both the attribute and values for the attribute. In other implementations, affirmative settings can be, but need not be, comprehensive. For example, affirmative settings can specify a particular attribute but not particular values for the attribute. Similarly, in some implementations, prohibitory settings are comprehensive, and in other implementations, prohibitory settings can, but need not be, comprehensive. For example, prohibitory settings can prohibit a particular attribute, one or more particular values for the attribute, or both the attribute and one or more particular values for the attribute. If the device determines that the settings it is applying are not comprehensive, for example, that the settings taken together specify that a particular attribute should be a variable text attribute but do not specify attribute values for the attribute, the device can prompt the user for the desired attribute values.

The control panel 202 can also maintain settings that only apply in specific situations. For example, settings can be application-specific settings, content-specific settings, or environment-specific settings. Application-specific settings apply only to text generated by particular applications executing on the device. For example, a user can create one set of settings to apply only to text from a web browser application and another set of settings to apply only to text from an electronic book reader application.

Content-specific settings apply only to text generated by particular content providers. For example, a user may create one set of settings to apply to text generated by a particular web site, and another set of settings to apply to other web sites.

Environment-based settings apply only in certain operational circumstances. For example, a user may create specific sets of settings to apply only when the device is plugged into an external display, being operated in low light conditions, located in a certain geographic area, traveling above a certain speed, being jostled, oriented in a particular way (landscape verses portrait), or combinations of these. Other environment-based settings could be specified for other operational circumstances. For example, a user could specify that when motion sensors on the device indicate sustained movement, the size of the text should be at least a minimum size. As another example, a user could specify particular formatting conventions for particular locations. For example, a user could specify that when the device was physically located at a particular location, e.g., the user's gym, the size of the text should be at least a minimum size.

When none of the specialized settings apply, the device can apply default settings. The device, content provider, and user can each specify a set of default settings. In some implementations, each default setting is comprehensive, e.g., specify both an attribute and specific values for the attribute. Additionally, in some implementations, the device and the content provider can specify mandatory settings, which the user may not override.

The control panel 202 can also maintain settings that specify particular systematic transformations for particular types of text. For example, a setting could specify that if anchor colors of blue and black are applied to a webpage, all unvisited hyperlinks in a web page, which appear in blue text by default, should be changed to a different color, e.g., red.

The text modification engine 204 receives input text 206 and outputs output text 208 that is the input text formatted in accordance with the settings maintained by the control panel 202. The input text 206 is received, for example, from an application executing on the device 200 or from an operating system executing on the device 200. In some implementations, the text is unformatted, and the text modification engine 204 applies formatting specified by the control panel before outputting the output text. In other implementations, the text is formatted and the text modification engine 204 modifies the formatting so that it is consistent with the formatting specified by the control panel. Details on the text modification are provided in more detail below, with reference to FIGS. 3 and 4.

Once the text modification engine 204 formats the input text 206 to produce the output text 208, the device 200 displays the output text 208 on a display.

In some implementations, at the time the settings are received, or before the settings are applied, the device 200 checks the settings to confirm that the settings are compatible. Two settings are incompatible if they reduce the readability of the text beyond a threshold. For example, red-orange text on a red background may be difficult to read. To confirm that the settings are compatible, the device applies one or more criterion. For example, the device can determine that the background and text colors are compatible by determining a distance metric measuring the difference between the two colors and determining that their distance metric satisfies a threshold. Different metrics of distance and different thresholds can be used for different appearance attributes. For example, if the appearance attribute is color, the distance metric can be the Euclidian distance between two attribute values in a particular color space such as Hue Saturation Value (HSV) or a Hue Saturation Lightness (HSL) color space. As another example, if the attribute is color represented by a hexadecimal triplet representing the red, green, and blue value of the color, the distance metric can be the sum of the differences between the hexadecimal values in the triplets.

In some implementations, if two settings are determined to be incompatible, the device can prompt the user for new settings. In some implementations, the device can ignore the incompatible setting and either use the next setting in a settings hierarchy, as described below with reference to FIG. 3, or can use a default value for the attribute specified by the setting. In some implementations, the device can determine that the attribute specified by the setting should not be modified even if it values for the attribute are specified on other settings stored by the device.

Figure 3:
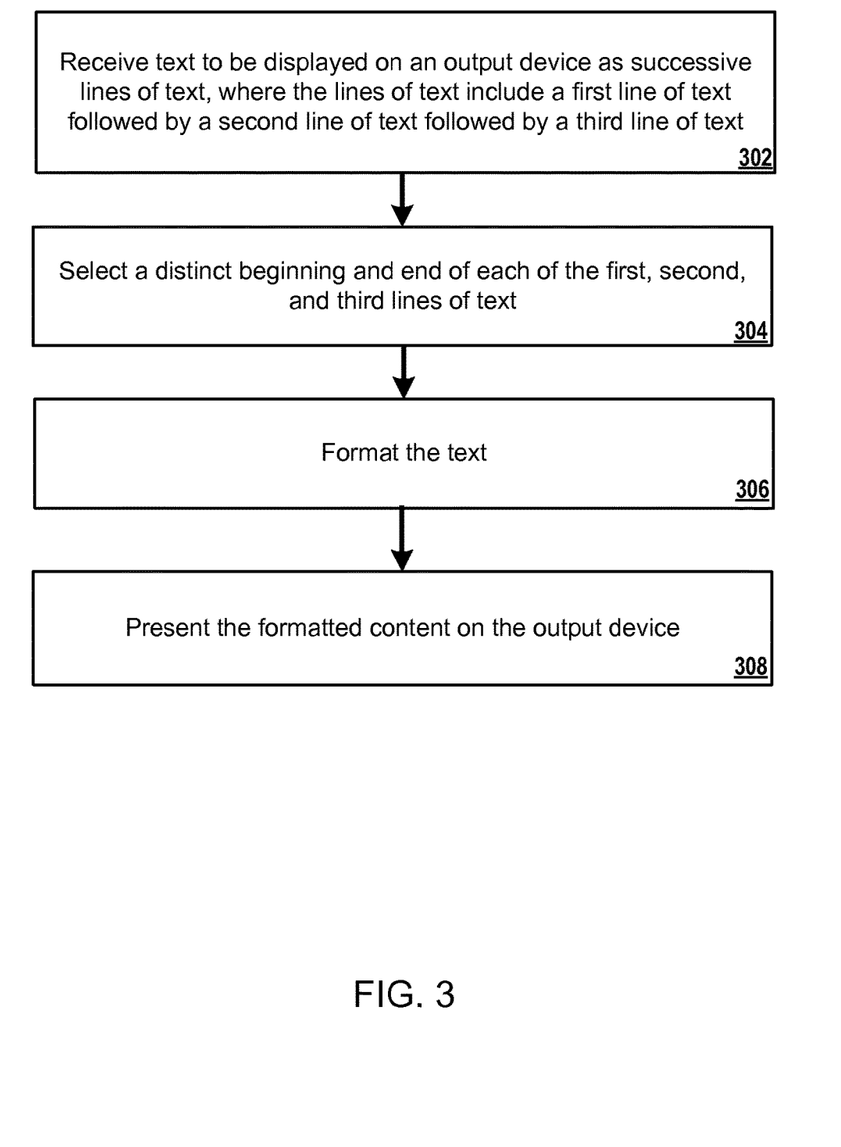
FIG. 3 is a flow chart of an example method for formatting text to assist a user in reading from the end of one line to the beginning of the following line.

FIG. 3 is a flow chart of an example method 300 for formatting text to assist a user in reading from the end of one line to the beginning of the following line. For convenience, the method 300 is described with reference to a device that performs the method. The device can be, for example, the device 200 described above with reference to FIG. 2.

The device receives text to be displayed on an output device as successive lines of text (302). The output device can be any device that displays content, for example, monitors, LCD displays, teleprompters, or screens of mobile devices. Output devices can also be printers, copiers, or other devices that generate physical copies of content.

The lines of text that are displayed on the output device include a first line of text immediately followed by a second line of text immediately followed by a third line of text. In some implementations, the received text is unformatted. In other implementations, the text is formatted, and the device preserves at least some of the formatting of the text that is specified along with the text. For example, in some implementations, the device receives information about the lines of text to be displayed, for example, where each line begins and ends, and the values of particular appearance attributes, e.g., font, size, boldness, etc. of the characters of the text. The device can maintain at least some of the specified formatting when modifying the formatting of the text. For example, to maintain specified line breaks, the device can only modify aspects of the formatting that do not affect the width or height of the line.

The formatting information can be specified, for example, in metadata for the text. This metadata can specify where each line begins and ends, for example, by specifying the number of characters in each line or the position of line break tags that indicate the end of a line. Alternatively or in addition, the metadata can include formatting assumptions, e.g., font, size, boldness, etc. on which the line breaks are based. When content is displayed at a fixed width, the device can determine the appropriate line breaks from the formatting assumptions, for example, by determining how many characters in the specified font, at the specified size and boldness, can be displayed on a line. Alternatively, the metadata can include page layout information that the device can use to determine where line breaks will fall in the output text.

In other implementations, the device divides the text into lines while applying the formatting, i.e., the device reflows the text in keeping with the specified formatting parameters.

The device selects a distinct line beginning and line end of each of the first, second and third lines of text (304). For example, the device can identify the beginning and end of each line of text, and then select a particular number of characters before and after each line break, respectively, as the line end of one line and the line beginning of the next line. Example techniques for identifying the beginning and end of each line of text are described in more detail below. Alternatively, the device can select a portion of a character as a line beginning or a line end.

The device formats the text (306). Formatting the text includes setting a respective first attribute value for a first appearance attribute, so that, with respect to the first appearance attribute, the text has visual continuity from the first line end to the second line beginning, but so that the text does not have visual continuity from the first line end to either the first line beginning or the third line beginning.

For example, the first appearance attribute can be color; size; weight, e.g., boldness; shape, e.g., font; or serif prominence of the text. In some implementations, the appearance attribute values are preselected to achieve visual continuity when applied to text output by the output device.

In some implementations, text has visual continuity from a line end to a line beginning when the line end and the line beginning would be considered visually similar if placed side by side. Different metrics can be used to measure visual similarity. For example, in some implementations, text is considered visually similar, for example, when a viewer cannot distinguish between the formatting with respect to the appearance attribute. In other implementations, text is considered visually similar when a user can distinguish between the formatting but would recognize the formatting as being similar, for example, when the text is two neighboring shades of red.

Other standards can also be used. For example, text can be considered visually similar when a difference value measuring the difference between two attribute values for the text is less than a threshold. Different metrics of distance and different thresholds can be used for different appearance attributes. For example, if the appearance attribute is color, the distance metric can be the Euclidian distance between two attribute values in a particular color space such as Hue Saturation Value (HSV) or a Hue Saturation Lightness (HSL) color space. As another example, if the attribute is color represented by a hexadecimal triplet representing the red, green, and blue value of the color, the distance metric can be the sum of the differences between the hexadecimal values in the triplets.

In other implementations, two attribute values for an appearance attribute must be identical, i.e., have the same value, for the text having the attribute values to be considered to have visual continuity.

In some implementations, the system also sets one or more other attribute values for other appearance attributes so that, with respect to the respective other attribute values, the text has visual continuity from the first line end to the second line beginning, but does not have visual continuity from the first line end to either the first line beginning or the third line beginning. In some implementations the characters of the text each have initial values for various appearance attributes when the text is received, and the system only modifies the attribute values of the first appearance attribute when formatting the text.

In some implementations the device receives formatted text, and the first line end and the second line beginning have initial attribute values for the first appearance attribute that yield appearances that are not visually different.

In some implementations, the device also applies incremental formatting to the text between the beginning and the end of each line of text, as described above with reference to FIG. 2.

The device uses the settings maintained by the control panel, along with details about the physical environment of the device, e.g., received from GPS sensors, motion sensors or ambient light sensors, to determine the appropriate appearance attributes to modify, as well as the appropriate values for the appearance attributes. For example, in some implementations, a setting can specify different color values for different light settings. In bright light, the setting can specify that subtle color changes, for example, resulting from purple and blue anchor colors, should be used. In low light, the setting can specify that more dramatic color changes, for example, resulting from red and blue anchor colors, should be used.

In some implementations, the device applies the settings according to a settings hierarchy that specifies how to resolve conflicts between the various settings. For example, the device can apply formatting specified by the settings according to the following hierarchy: (1) Mandatory device settings, (2) Mandatory content-provider settings, (3) Environment-based user settings, (4) Content-specific user settings, (5) Application-specific user settings, (6) Default user settings, (7) Default device settings, and (8) Default content-provider settings. This example hierarchy contains only a subset of the possible sets of settings; other settings, such as device environmental settings, can be included in other hierarchies. In some implementations, the control panel 102 allows users to view or modify portions of the hierarchy; for example, the user could specify whether content-specific settings or application-specific settings take precedence over the other. The user could also specify a sub-hierarchy in which the environmental settings, for example, are ranked. The settings can be affirmative or prohibitory. In some implementations, the device applies the settings according to the hierarchy as follows. The device iterates through the hierarchy, starting with the most highly-ranked settings, e.g., the mandatory device settings in the example hierarchy given above, and inspects the value for the variable text attribute specified by the setting. If the setting contains an affirmative entry, e.g. text size must be the variable text attribute, then the device makes the affirmative entry the variable text attribute. If the setting contains a prohibitory entry, e.g., text color may not be the variable text attribute, the device adds the prohibitory entry to a list of prohibited variable text attributes, processes any remaining settings at the level of the prohibitory setting, and proceeds to the next most highly ranked settings (mandatory content-provider settings in the above hierarchy).

The device then repeats the process with that setting, and possibly subsequent settings, until all necessary valid values are determined. A valid value is a setting that is affirmative and does not violate any of the preceding prohibitions. In some implementations, a valid value is a setting that is compatible with any other settings that the device has assigned to the text, for example, as described above with reference to FIG. 2. In implementations where multiple variable text attributes can be applied, the necessary valid values are all valid values, up to the number of multiple attribute types that can be applied. In implementations where only one variable text attribute is applied, the only necessary valid value is the first valid value that is determined.

After having determined the value of the variable text attribute, the device uses the hierarchy to determine the value of each of the other active settings. Active settings are comprised of all static text attributes, the variable text attribute, and any settings relevant to the application of the variable text attribute. For example, if the only variable text attribute were text color, then the anchor colors would be active settings, but anchor sizes would not. The device would use a procedure similar to the one used to determine the value of the variable text attribute to determine the value of the other active settings.

Once the device has determined which settings to apply, the device formats the text in accordance with those settings. The device sets the static text attributes for the text and sets each of the variable text attributes for the text in accordance with the relevant settings.

If base settings are used, then the device first identifies the base attribute value. This is the formatting that is present in the largest portion of the characters in the input text. The device would then set the base static text attribute of the characters to the base attribute value. The device allows the characters to retain some divergent formatting (e.g., size, boldness, color, etc.) in accordance with the limits specified in the control panel.

The device then sets the variable text attribute or attributes of the text. Applying the variable text attributes last ensures that the variable text attributes will take precedence over any inconsistent static text attribute values. For example, if a static text attribute value for text size contains a value of 12 pt and the variable text attribute specifies that the text size will vary from 11 pt to 13 pt, then the subsequent application of the variable text attribute will ensure that the variable text attribute properly overrides the static text attribute.

In some implementations, to set the values of the variable text attribute, the device firsts divides the input text into periods according to the period length setting. The device then iterates over the characters in each period and alters the variable text attribute value of each character based on its position in the period, for example, by formatting the beginning, middle, and end of each period, e.g., the beginning and end of each line, if the period is two lines.

In some implementations, the characters in the middle of each line (e.g., the characters between the beginning and middle and middle and end of the period) are visually different from the beginning and the end of the line. In some implementations, the characters in the middle of each line have a fixed attribute value. This fixed attribute value can be independent of the formatting applied to the beginning and the end of the lines. For example, the middle of each line can always be in black, size 12, or Times New Roman font, regardless of the formatting applied to the beginning and end of the line. In some implementations, there is a brief transition, but most of the middle of each line has a fixed attribute value. Consider an example where the text in line N begins red, quickly transitions to black, continues in black until nearly the end of line N, where it quickly transitions to blue. Line N+1, begins blue, quickly transitions to black, continues in black until nearly the end of line N+1, then quickly transitions back to red. This allows the text to be mostly one color, which may increase compatibility with background colors and other screen elements.

In other implementations, the device formats the middle of each line, e.g., the characters between the beginning and middle and middle and end of the period so that characters in the middle of each line have attribute values for the variable text attribute that transition from the attribute value for the variable text attribute of the beginning of the line to the attribute value for the variable text attribute of the end of the line. For example, if line length is uniform, the applicable variable text attribute is color and the anchor colors are red and blue, the engine would assign colors to all other characters so that the color of each character is similar to the colors of the characters adjacent to it and the color of the text between the start of the period and the middle point of the period transitions smoothly between the anchor colors. Accordingly, in this example, the characters at the beginning of the period would be the first anchor color (e.g., red), the characters one-fourth of the way through the period would be a first transition color (e.g., purple), which could be any color other than the two anchor colors, the characters one-half of the way through the period would be the second anchor color (e.g., blue), the characters three-fourths of the way through the period would be a second transition color (e.g., purple), and the characters at the end of the period would be the first anchor color (e.g., red). It is contemplated that the second transition color could differ from the first transition color (e.g., red to purple to blue to pink to red) so that characters in the middle of successive lines are not the same color. However, in some implementations, the first and second transition colors are the same. In other implementations, the characters in the middle are colored in a gradient so that the color varies even within a character. For example, the beginning and the end of each line could be a portion of a character, and the characters of the line would be formatted according to a gradient.

The device need not alter the variable text attribute with each subsequent character. For example, in some implementations, the device applies the same formatting to several adjacent characters. In these implementations, the device can determine the smoothness of the transitions, for example, from the settings maintained by the control panel. In other implementations, the transitions between characters can occur according to non-uniform character-to-character transition rates. For example, consider an example where the period is two lines and the anchor colors are red and blue. With uniform character-to-character transition rates, the characters in the text will change at uniform character increments. With non-uniform character-to-character transition rates, the characters do not change at uniform character increments. For example, with non-uniform character-to-character transition rates, a line could start in one anchor color, quickly change to the transition color, stay the transition color for most of the length of the line, and then quickly change to the second anchor color.

The device can use various methods to determine and apply the appropriate variable text attribute values. For example, the assignment of colors could be assisted by a lookup table that contains sequences of colors for various sets of anchor colors. Alternatively, the colors could be calculated afresh for each character. These calculations could be performed, for example, by inspecting the hexadecimal values for the anchor colors in order to determine the incremental changes to adjacent characters' hexadecimal values that will result in the proper progression throughout the period. Alterations of text size could be performed by using fractional text sizes (e.g., 12.1, 12.2, 12.3, etc.). Alterations of serif prominence could be done through many similar typefaces, which vary only in serif prominence, or just two typefaces (one with serifs and one without).

In some implementations, for example, when the lengths of the lines of text are not constant, the device adjusts the attribute values so that each line is formatted in accordance with its length. To do this, the device must determine where each line begins and ends. This can be determined from the information the device receives along with the text itself. Taking line length into account would require that character modifications be based on a character's position in a line, not simply its position in the period. For example, again assume that the variable text attribute is color, the anchor colors are red and blue, and the period is two lines. If a period is composed of two lines, one of which is 90 characters long and the other of which is 10 characters long, because, for example, it wraps around a picture, then the first line should begin with red characters, transition to a transition color in the middle, and end with blue characters. The second line should begin blue, quickly transition to a transition color, and then transition to red. Because the second line is shorter, the number of characters that are blue, the transition color, and red is fewer than the number of characters for the first line.

Once the device formats the content, the device presents the formatted content on the output device (308), for example, by sending the formatted content to the output device for display.

The device can apply the settings to the text at various times. For example, in some implementations, the device applies the settings in the control panel to text only when new text is displayed on the screen. In other implementations, the device listens for input from sensors on the device to determine when an aspect of the physical environment of the device has changed, e.g., the device has moved to a darker location, the device has moved from one location to another, the rate of travel of the device has increased, or the device has moved to another location. When the environment changes, the device can modify the text in real-time in accordance with any environmental changes. In some implementations, if the lengths of the lines of text change, for example, because a user changes the size of the font, the size of the window in which text is displayed, or the orientation of the device, e.g., between landscape and portrait, the device can re-format the text. In some implementations, the user can prompt the device to re-render the onscreen text by taking a specific action, e.g., shaking the device.

The above description describes modifying appearance attributes of text that is represented by code points that encode characters that have modifiable appearance attributes and are rendered using a digital font. However, in other implementations, the method 300 can be used to modify text that is represented by pixels in an image, for example, in a Tagged Image Format (.tif or .tiff) file, by modifying the image itself. In these implementations, the device receives an image and processes the image to identify individual lines of text in the image. For example, the device can identify a bounding box surrounding each line of text using conventional text image processing, e.g., OCR (optical character recognition), techniques.

The device then selects the beginning and end of each line of text by selecting respective regions of the bounding boxes. For example, the device can select a region beginning from the beginning of the bounding box and extending across the bounding box for n pixels as the beginning of a line and can select a region ending with the end of the bounding box and extending n pixels into the bounding box as the end of the line. Alternatively, if the device segregates characters and determines bounding boxes around each of the characters in each line of text, for example, using conventional text image processing, e.g., OCR techniques, the beginning and end of each line can be selected to be a region extending for n characters rather than n pixels.

In some implementations, the device formats the text by setting attribute values for the pixels inside the bounding box. For example, if the appearance attribute being changed is text color, the device can modify the color of the text pixels, and not modify the color of pixels corresponding to the background. As another example, if the appearance attribute being changed is background color, the device can modify the color of the background pixels, and not modify the color of the text pixels.

The device can determine whether a pixel is a text pixel or a background pixel using conventional techniques. For example, the device can compare the brightness of the color of the pixel to a threshold. If the brightness of the pixel satisfies the threshold, the pixel is a text pixel. Otherwise, the pixel is a background pixel. Brightness is a value that represents how much or how little light the pixel appears to emit. The threshold, and what is required to satisfy the threshold, can be determined from an analysis of the pixels in the image. For example, the device can analyze various regions of the image, for example, the edges of the image and the edges of the bounding boxes, to estimate the brightness of the background pixels in the image. Similarly, the device can analyze various regions of the image, for example, the interiors of the bounding boxes themselves, to estimate the brightness of the text pixels in the image. The device can then determine an appropriate threshold, and how to satisfy the threshold, from the two approximate brightnesses. For example, the device could select the same threshold for white text on a black background and black text on a white background. However, for a pixel in an image of white text on a black background to satisfy the threshold, the brightness value would have to be on one side of the threshold, while for a pixel in an image of black text on a white background to satisfy the threshold, the intensity value would have to be on the other side of the threshold. As another example, the device might select a more difficult to satisfy threshold for black text on a gray background than for black text on a white background, because black is closer in intensity to gray than it is to white. While the examples above describe intensity in the context of black-and-white or grayscale text; in colored images, color features of the pixels can be used to distinguish text from background pixels.

The device modifies the attribute values of the individual pixels as described above for modifying text attribute values. In some implementations, once text and background pixels are identified, the brightness of the pixels being modified is determined from the original intensity of the pixel. For example, if the text in the beginning of a line is to be set to blue, the system can set each pixel identified as text to blue with a brightness matching the original brightness of the pixel. In other implementations, the original brightness of the pixels is not used to determine the modified brightness of the pixels.

In some implementations, the device identifies bounding boxes around each of the characters in the text, using conventional text image processing, e.g., OCR techniques. The device then sets the appearance attributes of the pixels in each individual character bounding box to achieve the character-by-character formatting described above.

While the above describes changing the color of pixels in an image, other appearance attributes of the text can also be modified. For example, if the appearance attribute is size of the text, the device can vertically or horizontally scale regions of the image to modify the size of portions of the text. Scaling the text can include increasing or decreasing the size of the text. In some implementations, as part of this scaling, the device creates a second image corresponding to the first image, rather than modifying the original image of the text.

For example, the device can divide the bounding box for each line of text into three regions. The regions can be identified based on numbers of pixels or number of characters. The device can then create a new image where for one line, the first region of the line bounding box has been scaled up in one direction, e.g., horizontally or vertically, increasing the size of the text in the particular direction, the middle region of the line bounding box has been left the same, and the last region of the line bounding box has been scaled down in the particular direction, decreasing the size of the text in that direction. The device can pad the regions that stay the same or are scaled down with additional background pixels so that the regions have the same horizontal or vertical, whichever direction corresponds to the scaling, size as the scaled-up region.

The next line in the new image can be similarly modified, where the first region of the line bounding box has been scaled down, decreasing the size of the text, the middle region of the line bounding box has been left the same, and the last region of the line bounding box has been scaled up, increasing the size of the text. The device can continue to alternate the formatting of the lines in the new image in this way.

Other modifications, for example, more continuous modifications of size resulting from an identification of smaller regions of the line bounding boxes can alternatively be used.

Figure 4:
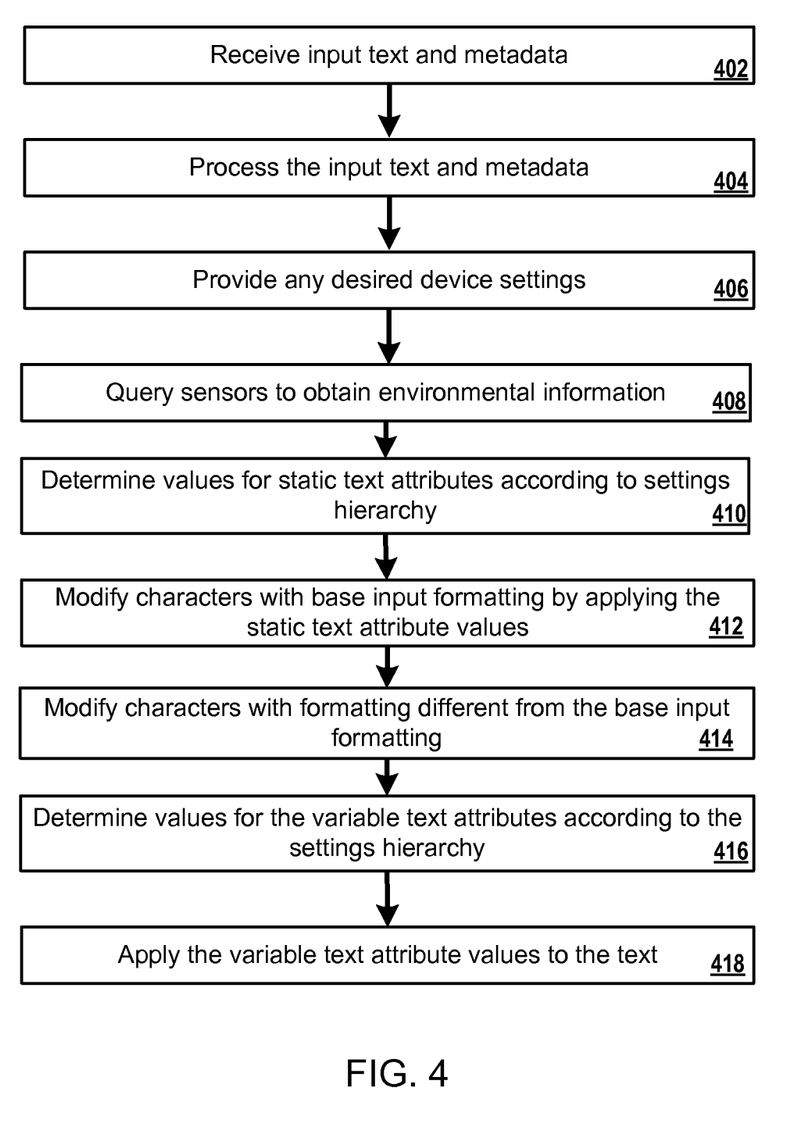
FIG. 4 is a flow chart of another example method for formatting text to assist a user in tracking from the end of one line to the beginning of the following line.

FIG. 4 is a flow chart of an example method 400 for formatting text to assist a user in reading from the end of one line to the beginning of the following line. FIG. 4 is a specific example of the general method 300 described above with reference to FIG. 3. For convenience, the method 400 is described with reference to a device that performs the method. The device can be, for example, the device 200 described above with reference to FIG. 2.

The device receives input text and metadata (402). The device processes the text and metadata (404). This processing includes, for example, determining a base input formatting for the text, extracting any settings contained in the metadata, and determining the number of characters in each line of text. If no device settings are stored, the device provides any desired settings (406). The device queries its sensors, for example, GPS and ambient light sensors, to obtain environmental information for the device (408).

The device then formats the text. As part of this formatting, the device determines attribute values for static text attributes according to a settings hierarchy (410) and modifies characters with the base input formatting by applying the static text attribute values (412). The device also modifies characters with formatting different from the base input formatting by applying the static text attribute values while allowing relative differences in input formatting to flow through (414). The device determines attribute values for the variable text attributes according to the settings hierarchy (416) and applies the variable text attributes to the text (418).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, while the disclosure above describes formatting text on a display, similar techniques could also be used to display text on static media, such as printed paper. As another example, while the disclosure describes formatting text, other content, such as sheet music with music notations, could be similarly formatted to assist a reader. As yet another example, the actions recited in the claims can be performed in a different order and still achieve desirable results. As yet another example, the processes depicted in the accompanying figures do not necessarily require the particular order shown, or sequential order, to achieve desirable results. In certain implementations, multitasking and parallel processing may be advantageous.

What is claimed is:

1. A system for formatting text to assist a user in reading text, the system comprising:
   a display device;
   one or more computers coupled to the display device and configured to perform operations comprising:
   determining that one or more formatting settings stored on the one or more computers include an assistive setting that determines how one or more particular appearance attributes will be changed when formatting text for display on the display device;
   receiving input text after the determining of the assistive setting;
   formatting the input text according to the assistive setting to produce output text for display on the display device as successive lines of output text ending at respective line breaks, wherein the formatting includes setting attribute values for the output text according to the assistive setting so that the successive lines of output text all have a continuity of appearance with respect to the particular appearance attributes across the line breaks separating the lines of text, and so that the successive lines of output text all have no continuity of appearance with respect to the particular appearance attributes between respective adjacent beginning portions of successive lines of output text; and
   presenting each formatted successive line of output text on the display device.

2. The system of claim 1, wherein receiving the input text comprises receiving the input text as characters having modifiable attributes, and formatting the input text to produce output text comprises setting respective values of the one or more particular appearance attributes of characters of the text.

3. The system of claim 2, wherein the operations further comprise:
   receiving the text as unformatted text; and
   selecting a position in the text for each respective line break.

4. The system of claim 2, wherein the operations further comprise:
   receiving the text as formatted text that includes line breaks; and
   maintaining the received line breaks in position when formatting the text.

5. The system of claim 2, wherein the display device and the one or more computers are embedded in a single device.

6. The system of claim 2, wherein the one or more particular appearance attributes include a background attribute.

7. The system of claim 2, wherein when the input text is received, characters in the text have respective initial attribute values for each of a plurality of appearance attributes including the one or more particular appearance attributes, and formatting the text further comprises not modifying attribute values for any appearance attributes in the plurality of appearance attributes other than one or more particular appearance attributes.

8. The system of claim 1, further comprising:
   setting values of the one or more particular appearance attributes for the output text, so that the output text has a respective continuity of visual appearance with respect to the particular appearance attributes within each line of the successive lines of output text from a beginning of the line through an end of the line.

9. The system of claim 1, further comprising:
   presenting each formatted successive line of output text in a window on the display device, wherein:
   the window has a left boundary and a right boundary; and
   each of the successive lines of text runs in a straight line from the left boundary toward the right boundary, and none of the output text is displayed between any line beginning and the left boundary or between any line end and the right boundary.

10. The system of claim 1, wherein the one or more computers are configured to perform the operations of receiving, formatting, and presenting for an unlimited number of successive lines of text.

11. The system of claim 1, wherein setting values of the one or more particular appearance attributes for the output text so that the successive lines of text have a continuity of appearance across the line breaks comprises selecting values of the one or more particular appearance attributes that are within a predetermined threshold distance of each other.

12. The system of claim 1, wherein:
the successive lines of output text each have a respective line middle that extends between a line beginning and a line end of the respective line; and
formatting the input text further comprises setting values of the one or more particular appearance attributes for the line middle of each of the successive lines of output text so that each line middle has values of the one or more particular appearance attributes that transition from values for the respective line beginning to values for the respective line end.

13. The system of claim 1, wherein each line of the successive lines of output text has a middle, and setting values of the one or more particular appearance attributes for the output text comprises setting values of the one or more particular appearance attributes for the middle so that the middle of each successive line of output text is visually different from the beginning portion of the line and from an end portion of the line.

14. The system of claim 1, wherein receiving the input text comprises receiving the input text in the form of pixels in an image, and wherein formatting the input text to produce output text comprises modifying the image itself by setting values of the one or more particular appearance attributes for at least some of the pixels in the image.

15. The system of claim 14, wherein when the input text is received, characters in the text have respective initial attribute values for each of a plurality of appearance attributes including the one or more particular appearance attributes, and formatting the text further comprises not modifying attribute values for any appearance attributes in the plurality of appearance attributes other than one or more particular appearance attributes.

16. The system of claim 14, wherein each line of the successive lines of output text has a middle, and setting values of the one or more particular appearance attributes for the output text comprises setting values of the one or more particular appearance attributes for the middle so that the middle of each successive line of output text is visually different from the beginning portion of the line and from an end portion of the line.

17. The system of claim 14, wherein the display device and the one or more computers are embedded in a single device.

18. The system of claim 14, wherein the one or more particular appearance attributes include a background attribute.

19. A computer-implemented method, comprising:
determining that one or more formatting settings stored on the one or more computers include an assistive setting that determines how one or more particular appearance attributes will be changed when formatting text for display on a display device;
receiving input text after the determining of the assistive setting;
formatting the input text according to the assistive setting to produce output text for display on the display device as successive lines of output text ending at respective line breaks, wherein the formatting includes setting attribute values for the output text according to the assistive setting so that the successive lines of output text all have a continuity of appearance with respect to the particular appearance attributes across the line breaks separating the lines of text, and so that the successive lines of output text all have no continuity of appearance with respect to the particular appearance attributes between respective adjacent beginning portions of successive lines of output text; and
presenting each formatted successive line of output text on the display device.

20. A non-transitory computer storage medium encoded with a computer program, the computer program comprising instructions that, when executed by data processing apparatus, cause the data processing apparatus to perform operations comprising:
determining that one or more formatting settings stored on the one or more computers include an assistive setting that determines how one or more particular appearance attributes will be changed when formatting text for display on a display device;
receiving input text after the determining of the assistive setting;
formatting the input text according to the assistive setting to produce output text for display on the display device as successive lines of output text ending at respective line breaks, wherein the formatting includes setting attribute values for the output text according to the assistive setting so that the successive lines of output text all have a continuity of appearance with respect to the particular appearance attributes across the line breaks separating the lines of text, and so that the successive lines of output text all have no continuity of appearance with respect to the particular appearance attributes between respective adjacent beginning portions of successive lines of output text; and
presenting each formatted successive line of output text on the display device.

* * * * *